(12) United States Patent
Flick

(10) Patent No.: US 9,416,762 B2
(45) Date of Patent: Aug. 16, 2016

(54) REMOTE START CONTROL SYSTEM FOR A VEHICLE WITH A BUS CONTROLLABLE WINDOW AND ASSOCIATED METHODS

(71) Applicant: Omega Patents, L.L.C., Douglasville, GA (US)

(72) Inventor: Kenneth E. Flick, Douglasville, GA (US)

(73) Assignee: OMEGA PATENTS, L.L.C., Douglasville, GA (US)

( * ) Notice: Subject to any disclaimer, the term of this patent is extended or adjusted under 35 U.S.C. 154(b) by 302 days.

(21) Appl. No.: 14/208,217

(22) Filed: Mar. 13, 2014

(65) Prior Publication Data

US 2014/0278024 A1 Sep. 18, 2014

Related U.S. Application Data

(60) Provisional application No. 61/792,895, filed on Mar. 15, 2013.

(51) Int. Cl.
*F02N 11/00* (2006.01)
*F02N 11/08* (2006.01)
(Continued)

(52) U.S. Cl.
CPC .......... *F02N 11/087* (2013.01); *B60H 1/00657* (2013.01); *B60H 1/00964* (2013.01); *B60R 25/209* (2013.01); *B60W 10/02* (2013.01); *B60W 10/06* (2013.01); *B60W 10/10* (2013.01); *B60W 10/182* (2013.01); *B60W 10/184* (2013.01); *B60W 10/30* (2013.01); *B60W 30/18054* (2013.01); *F02N 11/08* (2013.01); *F02N 11/0807* (2013.01); *F16H 61/00* (2013.01);

(Continued)

(58) Field of Classification Search
CPC .............. B60R 25/209; F02N 11/0807; F02N 11/0811; F02N 2200/0804
USPC ................... 701/113; 123/179.2; 340/426.17, 340/426.27; 236/51; 62/244; 65/42
See application file for complete search history.

(56) References Cited

U.S. PATENT DOCUMENTS

| | | |
|---|---|---|
| 4,055,772 A | 10/1977 | Leung |
| 4,383,242 A | 5/1983 | Sassover et al. |

(Continued)

OTHER PUBLICATIONS

"The Thick and Thin of Car Cabling" by Thompson appearing in the IEEE Spectrum, Feb. 1996, pp. 42-45.

(Continued)

*Primary Examiner* — Erick Solis
(74) *Attorney, Agent, or Firm* — Allen, Dyer, Doppelt, Milbrath & Gilchrist, P.A.

(57) ABSTRACT

A remote start control system is for a vehicle including a data communications bus extending through the vehicle, an engine, a window motor associated with a window and operating the window based upon a move window command on the data communications bus, and a vehicle climate control system operable based upon a climate control command on the data communications bus. The remote start control system may include a remote start transmitter to generate a remote start signal, and a vehicle remote start controller at the vehicle that may include a receiver to receive the remote start signal, and at least one processor cooperating with the receiver. The at least one processor, in response to the remote start signal, may generate the move window command on the data communications bus, generate the climate control command on the data communications bus, and start the engine.

28 Claims, 8 Drawing Sheets

(51) Int. Cl.
  *B60W 10/02* (2006.01)
  *B60W 10/30* (2006.01)
  *B60W 10/06* (2006.01)
  *B60R 25/20* (2013.01)
  *B60W 10/10* (2012.01)
  *B60W 10/18* (2012.01)
  *B60W 10/184* (2012.01)
  *B60W 30/18* (2012.01)
  *F16H 61/00* (2006.01)
  *B60H 1/00* (2006.01)
  *F02N 11/10* (2006.01)
  *B60W 50/00* (2006.01)

(52) U.S. Cl.
  CPC ............ *B60W 2050/0045* (2013.01); *B60W 2710/1005* (2013.01); *B60Y 2400/76* (2013.01); *F02N 11/103* (2013.01); *F02N 2200/0804* (2013.01)

(56) References Cited

U.S. PATENT DOCUMENTS

| | | | |
|---|---|---|---|
| 4,538,262 A | 8/1985 | Sinniger et al. | |
| 4,697,092 A | 9/1987 | Roggendorf et al. | |
| 4,760,275 A | 7/1988 | Sato et al. | |
| 4,792,783 A | 12/1988 | Burgess et al. | |
| 5,146,215 A | 9/1992 | Drori | |
| 5,252,966 A | 10/1993 | Lambropoulos et al. | |
| 5,612,578 A | 3/1997 | Drew | |
| 6,346,876 B1 | 2/2002 | Flick | |
| 6,392,534 B1 * | 5/2002 | Flick | B60R 16/03 340/426.17 |
| 6,529,124 B2 | 3/2003 | Flick | |
| 6,756,885 B1 | 6/2004 | Flick | |
| 6,756,886 B2 | 6/2004 | Flick | |
| 6,812,829 B1 † | 11/2004 | Flick | |
| 7,010,402 B2 | 3/2006 | Flick | |
| 7,031,826 B2 | 4/2006 | Flick | |
| 7,046,126 B2 † | 5/2006 | Flick | |
| 7,068,153 B2 | 6/2006 | Flick | |
| 7,091,822 B2 | 8/2006 | Flick et al. | |
| 7,205,679 B2 | 4/2007 | Flick | |
| 7,224,083 B2 | 5/2007 | Flick | |
| 7,369,936 B2 | 5/2008 | Flick | |
| 7,378,945 B2 | 5/2008 | Flick | |
| 8,061,626 B2 | 11/2011 | Flick | |
| 8,313,039 B2 † | 11/2012 | Flick | |
| 9,140,228 B2 | 9/2015 | Flick | |
| 2002/0109583 A1 * | 8/2002 | Losey | B60H 1/0065 340/5.72 |
| 2004/0111199 A1 * | 6/2004 | Javaherian | F02N 11/0807 701/36 |
| 2005/0225175 A1 * | 10/2005 | Maehara | B60W 10/06 307/10.1 |
| 2008/0117079 A1 * | 5/2008 | Hassan | B60R 25/045 340/901 |
| 2010/0019049 A1 * | 1/2010 | Flick | B60H 1/004 236/51 |
| 2011/0086668 A1 * | 4/2011 | Patel | G08C 17/02 455/556.1 |
| 2014/0278025 A1 | 9/2014 | Flick | |

OTHER PUBLICATIONS

"Surface Vehicle Standard, Class B Data Communications Network Interface", SAE J1850, Jul. 1995, 52 pgs.

"Surface Vehicle Information Report, Chrysler Sensor and Control (CSC) Bus Multiplexing Network for Class 'A' Applications", SAE J2058, Jul. 1990, 26 pgs.

\* cited by examiner
† cited by third party

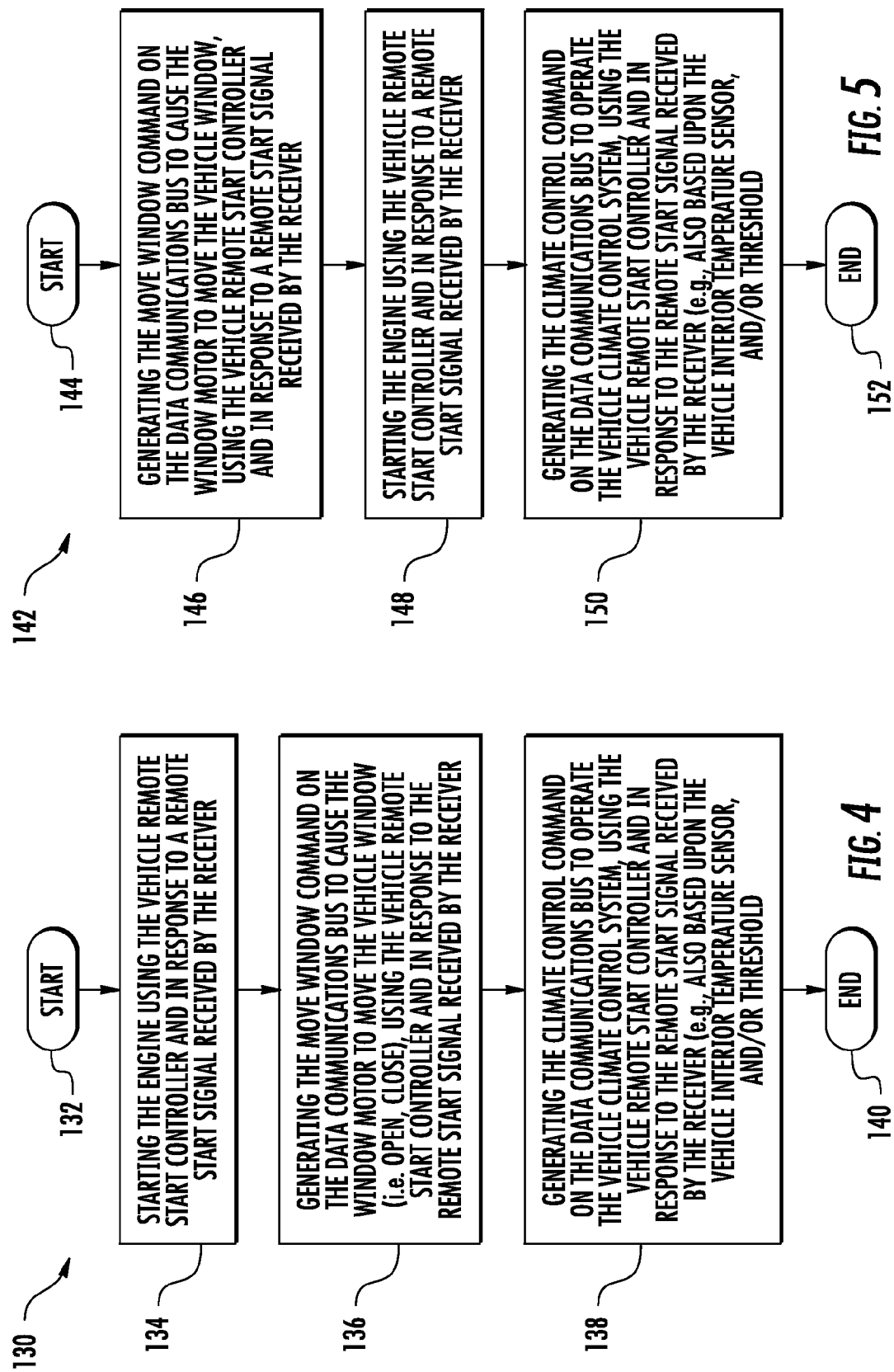

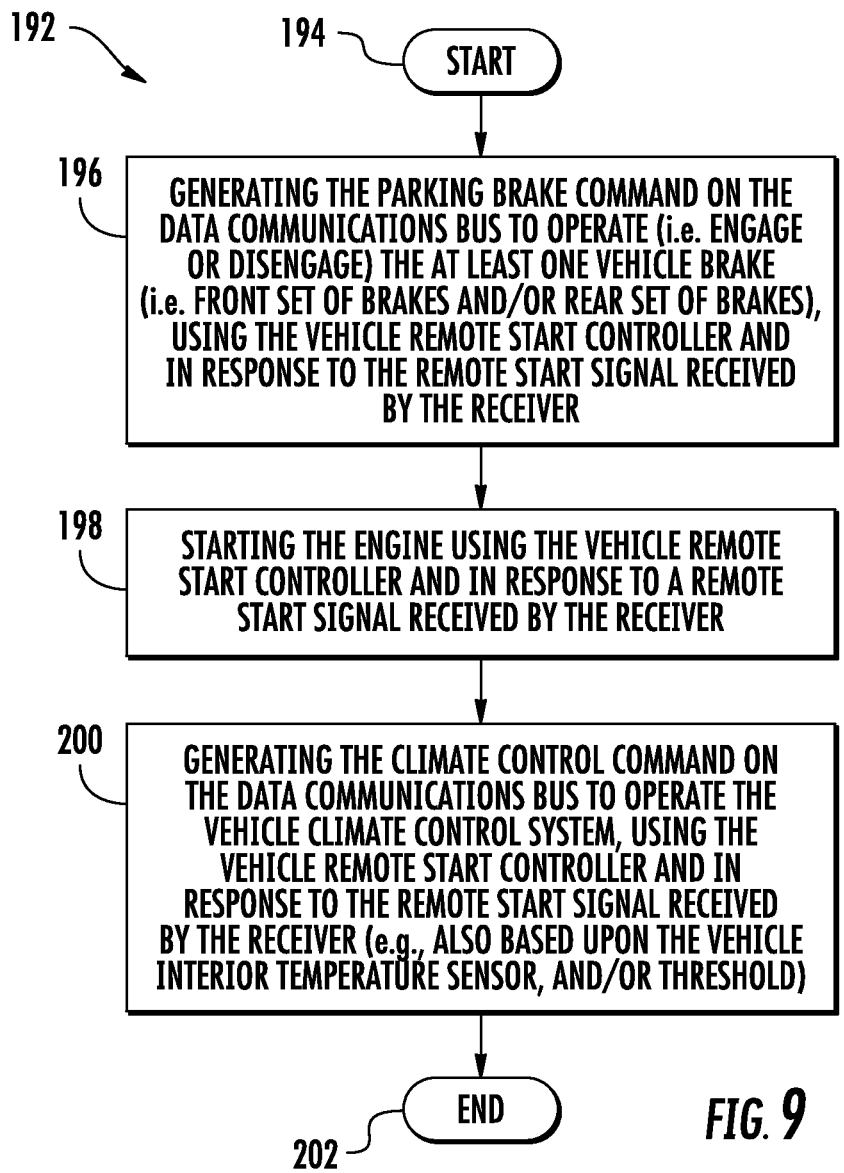

REMOTE START CONTROL SYSTEM FOR A VEHICLE WITH A BUS CONTROLLABLE WINDOW AND ASSOCIATED METHODS

FIELD OF THE INVENTION

The present invention relates to the field of remote vehicle starting, and, more particularly, to remote vehicle starting devices and related methods.

BACKGROUND OF THE INVENTION

Remote vehicle starting systems are widely used to allow a user to start a vehicle before entering the vehicle, so as to allow the engine of the vehicle to warm up to operating temperatures, for example. A typical remote starting system, for example, includes a central processor or controller connected to a starter circuit for the vehicle engine to cause the starter circuit to start the vehicle engine. A typical remote starting system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to operate the remote start system. Also related to remote control of a vehicle function U.S. Pat. No. 5,252,966 to Lambropoulous et al, discloses a remote keyless entry system for a vehicle. The keyless entry system permits the user to remotely open the vehicle doors or open the vehicle trunk using a small handheld transmitter.

Some remote start systems are connected to other vehicle devices to provide functionality in addition to remote starting. Unfortunately, many prior remote start systems needed to be directly connected by wires to individual vehicle devices. In other words, such a remote start system was hardwired to various vehicle components, typically by splicing into vehicle wiring harnesses or via interposing T-harnesses and connectors. The number of electrical devices in a vehicle has increased so that the size and complexity of wiring harnesses also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have reduced the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45. The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been developed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990.

Remote starting of the engine presents additional difficulties compared to some other vehicle control applications. This is so because starting the engine may require certain vehicle conditions are correct prior to starting the engine and while the engine is running with the vehicle unattended. It may also be necessary for a remote starter system to bypass an immobilizer device which is part of the security system of some vehicles. For example, U.S. Pat. No. 5,612,578 to Drew entitled "Vehicle Engine Start Control Apparatus Including Interface Device Facilitating Installation and Related Methods" discloses a remote start system which is hardwire connected via mating plugs for more conveniently bypassing an immobilizer circuit based upon a coded resistance of the ignition key.

A significant advance in remote start control of a vehicle is disclosed in U.S. Pat. No. 7,031,826 to Flick, and assigned to the assignee of the present application. The patent discloses integration of remote start functions in a vehicle include a data communications bus extending throughout the vehicle. In aftermarket embodiments, installation of the receiver and associated controller is greatly simplified as compared to equivalent hard-wired systems.

Also relating to remote starting, U.S. Pat. No. 7,031,826 to Flick, discloses determining a transmission position from the data bus, before permitting remote starting. U.S. Pat. No. 8,061,626, also to Flick, disc loses a remote climate control system operable over the data bus in a hybrid vehicle including a combination gas/electric power train, or an electric only vehicle. U.S. Pat. No. 7,046,126, also to Flick, discloses a window control system that operates via remote commands received at the vehicle and sent over the data bus within the vehicle.

Despite advances in vehicle remote control, particularly via communication over the vehicle data bus, further advancements in the field are still desirable.

SUMMARY OF THE INVENTION

In view of the foregoing background, it is therefore an object of the present invention to provide a remote start system for a vehicle that provides additional functionality and user convenience.

This and other objects, features, and advantages in accordance with the present invention are provided by a remote start control system for a vehicle that includes a data communications bus extending through the vehicle, an engine, a window motor associated with a window and operating the window based upon a move window command on the data communications bus, and a vehicle climate control system operable based upon a climate control command on the data communications bus. The remote start system may include a remote start transmitter remote from the vehicle and configured to generate a remote start signal, and a vehicle remote start controller at the vehicle. The vehicle remote start controller may include a receiver configured to receive the remote start signal from the remote start transmitter, and at least one processor cooperating with the receiver. The at least one processor may be configured to in response to the remote start signal generate the move window command on the data communications bus to cause the window motor to move the window, generate the climate control command on the data communications bus to operate the climate control system, and start the engine.

The at least one processor may be configured to generate the move window command to cause the window motor to open the window, for example. The at least one processor may be configured to generate the move window command to cause the window motor to close the window. In addition, the at least one processor may be configured to start the engine after generating the move window command and before generating the climate control command.

The vehicle may include a vehicle interior temperature sensor in communication with the vehicle remote start controller, and the at least one processor may generate the climate control command on the data communications bus also based upon the vehicle interior temperature sensor, for example. In some applications, the vehicle interior temperature sensor may be coupled to the data bus for communication with the vehicle remote start controller thereover.

The climate control system may include an air conditioning compressor. The at least one processor may be configured to generate the climate control command to activate the air conditioning compressor when an interior temperature sensed from the interior temperature sensor is above a threshold. The climate control system may also include a heater. The at least one processor may be configured to generate the climate control command to activate the heater when an interior temperature sensed from the interior temperature sensor is below a threshold.

The climate control system may include a ventilation blower. The at least one processor may be configured to generate the climate control command to activate the ventilation blower, for example.

The remote start transmitter may include a cellular telephone. Alternatively or additionally, the remote start transmitter may be a central monitoring station communicating over the cellular communications network. Of course the remote start transmitter may be provided by a cellphone communicating directly with the vehicle receiver (e.g. Bluetooth or WiFi), indirectly with the vehicle receive via the cellular network, or via a communication path through a central monitoring station.

The remote start controller may in the form of one or more housings, including associated circuitry, added to vehicle after its original manufacture—in other words, the remote start controller may be provided by one or more aftermarket components, considered alone or in cooperation with one or more factory controllers. In other embodiments, the circuitry for the remote start controller may be provided in the vehicle as part of the original factory assembly. In addition, the vehicle remote start controller may be a multi-vehicle compatible remote start controller.

A method aspect is directed to a method of operating a remote start control system for a vehicle that includes a data communications bus extending through the vehicle, an engine, a window motor associated with a window and operating the window based upon. a move window command on the data communications bus, and a vehicle climate control system operable based upon a climate control command on the data communications bus. The method may include in response to a remote start signal from a remote start transmitter away from the vehicle, generating, using a vehicle remote start controller at the vehicle, the move window command on the data communications bus to cause the window motor to move the window, generating, using the vehicle remote start controller, the climate control command on the data communications bus to operate the vehicle climate control system, and starting, using the vehicle remote start controller, the engine.

BRIEF DESCRIPTION OF THE DRAWINGS

FIG. 4 is a flowchart of a method of operating the remote start system of FIG. 4.

FIG. 5 is a flowchart of another method of operating the remote start system of FIG. 4.

FIG. 9 is a flowchart of a method of operating the remote start system of FIG. 8.

DETAILED DESCR ION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

Figure 1:
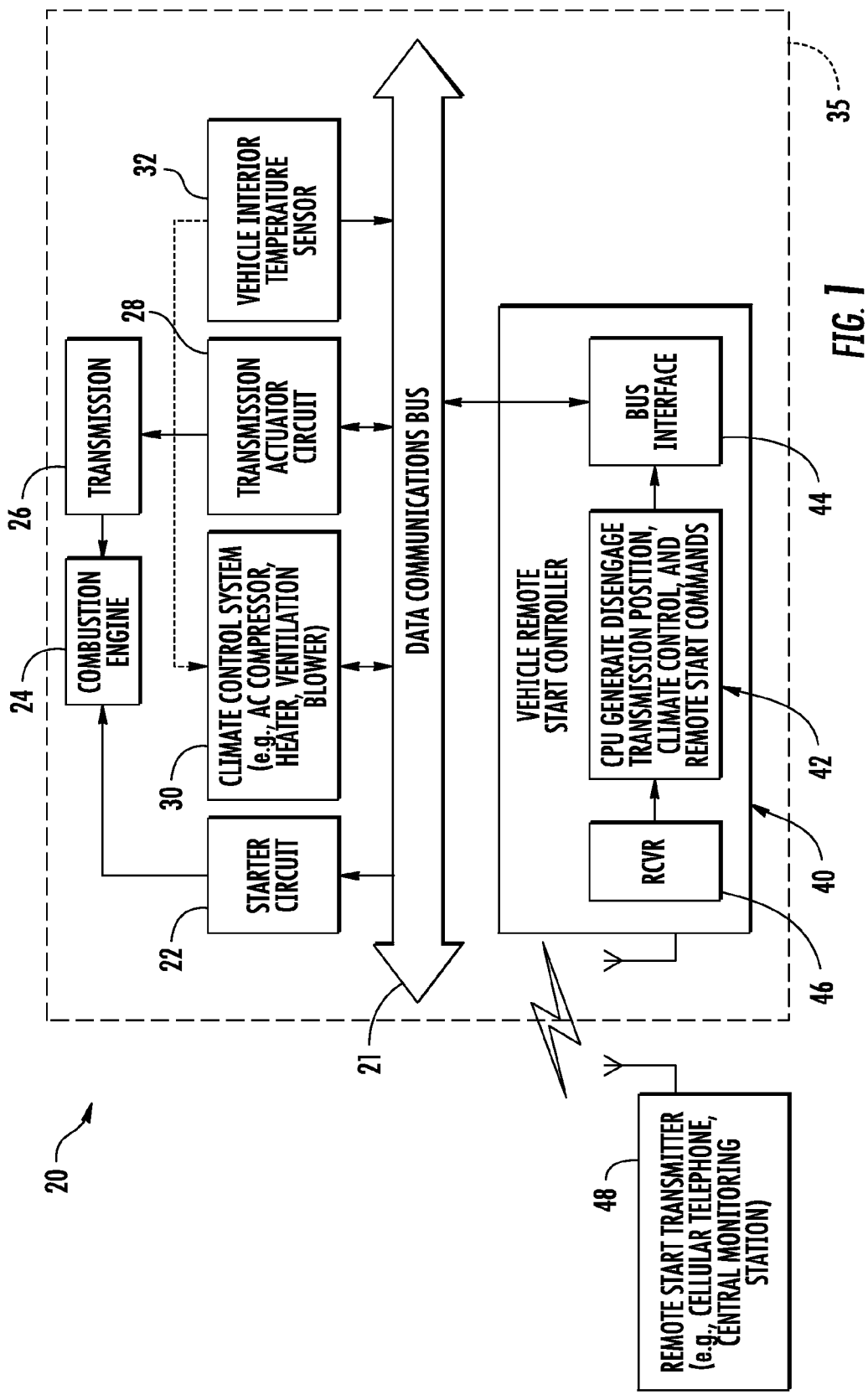
FIG. 1 is a schematic block diagram of a remote start system for a vehicle in accordance with the present invention.

Referring initially to FIG. 1, a remote start control system 20 for a vehicle 35 is now described. The vehicle includes a data communications bus 21 extending throughout the vehicle, an engine 24, and a transmission 26 associated with the engine. The engine 24 may be a combustion engine, and the transmission 26 may be an automatic transmission or an electronically controlled manual transmission. A starter circuit 22 is coupled to the data communications bus 21 and to the combustion engine for starting the engine, and may include both a starter and a relay or other controller, such as a powertrain controller, for staring the engine.

A transmission actuator circuit 28 is coupled to the data communications bus 21 and to the transmission 26 for operating the transmission, and may include both a transmission actuator and a relay or other controller, such as a powertrain or transmission controller.

The vehicle 35 further includes a vehicle remote climate control system 30 operable based upon a climate control command on the data communications bus 21. This vehicle remote climate control system 30 may include an air conditioning compressor, a ventilation blower, and/or a heater. The air conditioning compressor may be mechanically operated via a physical link to the engine (i.e. a belt or shaft), or may be electrically operated. The ventilation blower is typically electrically operated. The source of heat for the heater may come from engine waste heat or be electrically generated.

It should be appreciated that the data communications bus 21 may be a digital, serial data communications bus, used to multiplex communications between the various vehicle components. By extending through the vehicle 35, it should be understood that the data communications bus 21 may physically extend through the vehicle, that is, such as, through both the passenger compartment and the engine compartment. The data bus 21 may include a high speed data bus, low speed data bus, or both within the vehicle.

The transmission 26 has a selectable disengaged position based upon a disengage transmission position command on the data communications bus 21. By selectable disengaged position, it is meant that the engine 24 is decoupled from the drive wheels such that the vehicle 35 remains stationary while the engine runs. As such, those of skill in the art will understand that the selectable disengaged position may be a park or neutral position. Neutral may be accomplished via the disengagement of a clutch in the transmission from the engine in the case where the transmission 26 is an electronically controlled manual transmission, for example.

A vehicle remote start controller 40 includes a receiver 46 at the vehicle 35. The vehicle remote start controller 40 includes a central processing unit (CPU) 42 or processor coupled to a bus interface 44. Of course, there may be more than one CPU 42, and/or the functions may be shared across multiple CPUs. The bus interface 44 of the vehicle remote start controller 40 is, in turn, coupled to the data communications bus 21 for communications thereover.

The receiver 46 is for receiving a remote start signal, such as, from a remote start transmitter 48 to be carried by a user when away from the vehicle 35, and configured to transmit the remote start signal. The remote start transmitter 48 may allow for the sending of different remote start signals that cause the vehicle remote start controller 40 to output different start commands on the data communications bus 21 that cause the operation of different vehicle components.

In other embodiments, the remote start transmitter 48 may be a central monitoring station communicating over the cellular communications network. The remote start transmitter 48 may also be provided by a cellphone communicating directly with the vehicle receiver, indirectly with the vehicle receiver via the cellular network, or via a communication path through a central monitoring station.

In some embodiments, the remote start transmitter 48 may have a receiver incorporated therein for two-way communication with the vehicle in some embodiments. Accordingly, the user may be able to access an internal temperature of the vehicle before deciding whether to perform a remote start.

The CPU 42, in response to the receiver 46 receiving the remote start signal, is configured to generate the disengage transmission position command on the data communications bus 21 to select the disengaged position for the transmission 26. This causes the transmission actuator circuit 28 to shift the transmission 26 to the disengaged position. As will be appreciated by those skilled in the art, the disengaged position may not need to be selected unless the transmission is already in an engaged position. Accordingly, one or more sensors, riot shown, may supply the state of the transmission to the vehicle remote start controller 40 in some embodiments.

The CPU 42, in response to the receiver 46 receiving the remote start signal is also configured to generate the climate control command on the data communications bus 21 to operate the vehicle climate control system 30. This causes operation of the air conditioning compressor, ventilation blower, and/or heater, as will be appreciated by those of skill in the art. The CPU 42, in response to the receiver 46 receiving the remote start signal is further configured to start the engine 24 by generating a start signal on the data communications bus 21 for the starter circuit 22 to start the engine.

It should be understood that these functions need not be performed in the order described above. For example, the vehicle remote start controller 40, via the CPU 42, may generate the disengage transmission position command on the data communications bus 21 before generating the climate control command. The CPU 42 may generate the disengage transmission position command before starting the engine 24, but after generating the climate control command. Indeed, these commands may be generated in any order depending on the application, and the order of command generation may be set by the remote start transmitter 48 or the vehicle remote start controller 40 in some applications. Allowing the commands to be generated in different orders may allow easier adaption of the remote start system 20 to different vehicles and different user desires.

The vehicle 35 may include a vehicle interior temperature sensor 32 in communication with the vehicle remote start controller 40, such as over the data communications bus 21. In other embodiments, the temperature sensor 32 may be hardwire connected. This vehicle interior temperature sensor 32 senses the temperature of the passenger compartment of the vehicle. The vehicle remote start controller 40 may also generate the climate control command on the data communications bus 21 based upon the vehicle interior temperature sensor 32. For example, the climate control command may activate the air conditioning compressor if the vehicle interior temperature sensor 32 reports the vehicle interior temperature is above a threshold, and may activate the heater if the vehicle interior temperate is below a threshold. In other embodiments, the climate control system 30 may be activated further based upon an external temperature sensor, not shown, alone or in combination with the internal sensor 32.

Those of skill in the art will appreciate that the remote start system 20 may be multi-vehicle compatible. More details of multi-vehicle compatible devices may be found in the following references, each of which is incorporated by reference herein in its entirety, and assigned to the assignee of the present invention: U.S. Pat. Nos. 7,378,945; 7,369,936; 7,224,083; 7,205,679; 7,091,822; 7,068,153; 7,046,126; 7,031,826; 7,010,402; 6,812,829; 6,756,886; 6,756,885; 6,529,124; and 6,346,876.

Figure 2:
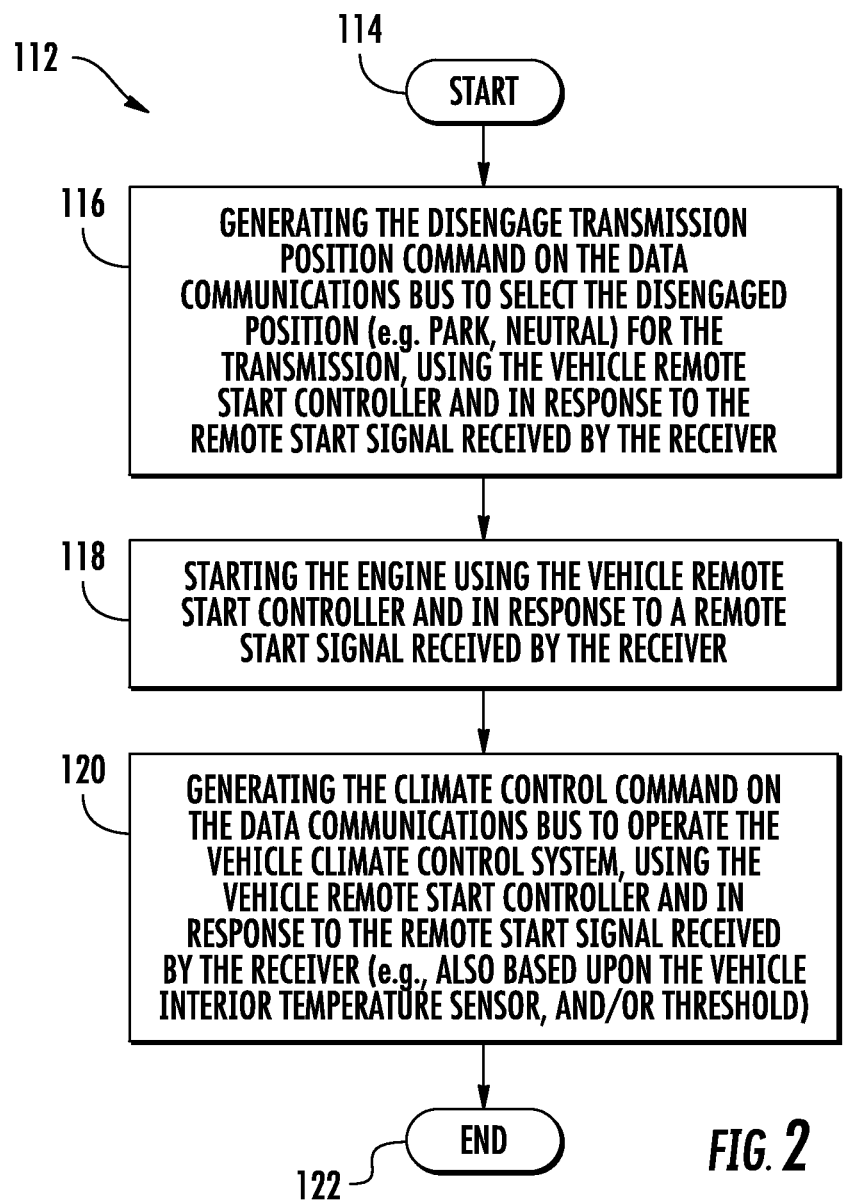
FIG. 2 is a flowchart of a method of operating the remote start system of FIG. 1.

With reference to the flowchart 112 shown in FIG. 2, a method of operating the remote start system is now described. After the start (Block 114), the disengage transmission position command is generated on the data communications bus to select the disengaged position for the transmission, using the vehicle remote start controller and in response to the remote start signal (Block 116). Then, the engine is started using the vehicle remote start controller and in response to the remote start signal (Block 118). Thereafter, the climate control command is generated on the data communications bus to operate the vehicle climate control system, using the vehicle remote start controller and also in response to the remote start signal (Block 120). Block 122 indicates the end of the method.

Figure 3:
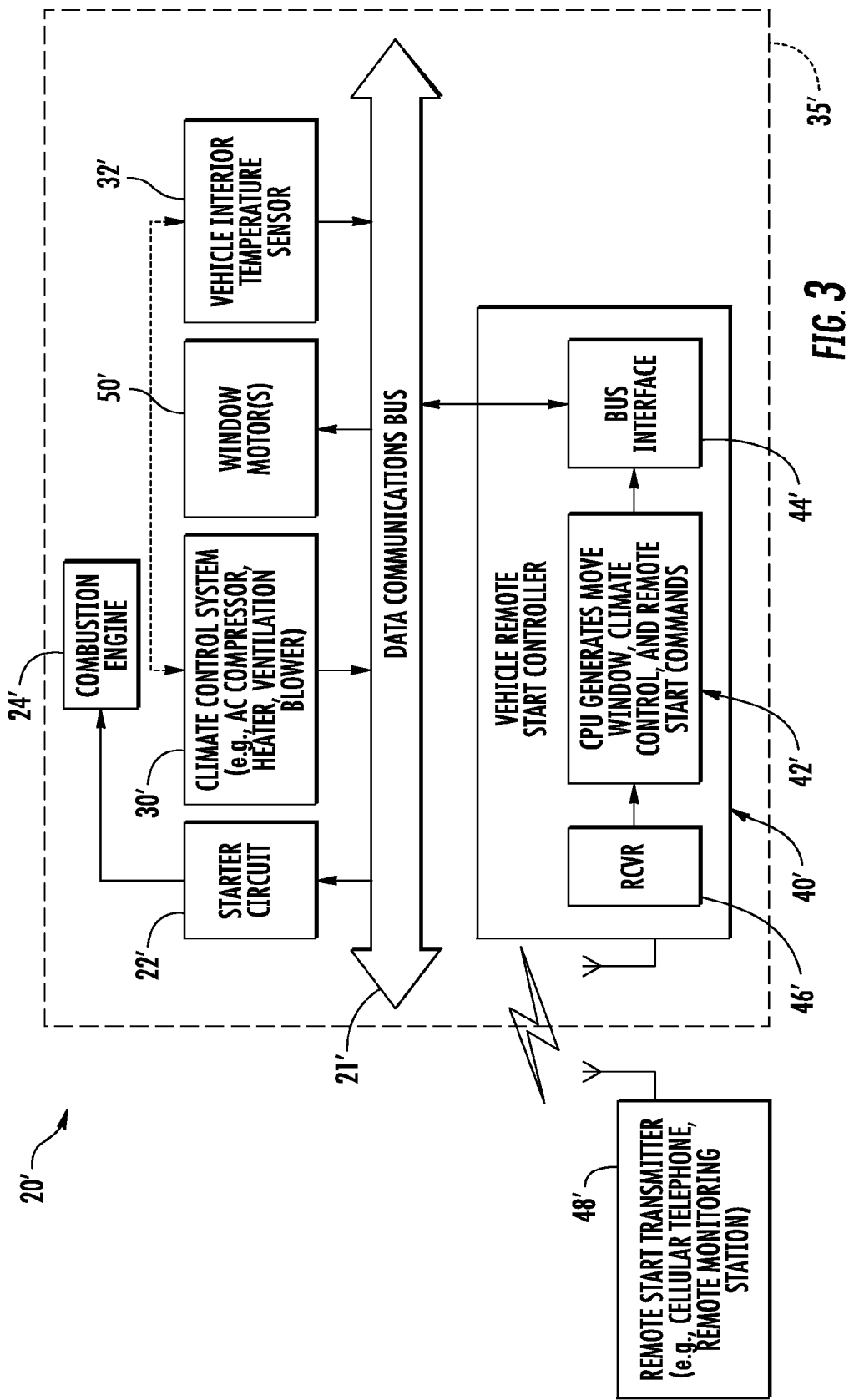
FIG. 3 is a schematic block diagram of an alternative embodiment of a remote start system for a vehicle in accordance with the present invention.

With reference to FIG. 3, another embodiment of the remote start control system 20' is now described. The various components shared in common with the remote start control system 20 shown in FIG. 1 operate similarly and need no further description. In this embodiment, one or more window motors 50' of the vehicle are coupled to the data communications bus 21', either directly or through an intervening controller, such as the Body Control Module (BCM). The window motor 50' operates a window of the vehicle 35' (i.e. opens, closes, partially opens, partially closes).

In response to receiving the remote start signal via the receiver 46', the vehicle remote start controller 40' and particularly the CPU 42' is configured to generate the move window command on the data communications bus 21' to cause the window motor 50' to move the vehicle window. In response to receiving the remote start signal via the receiver 46', the CPU 42' is also configured to generate the climate control command on the data communications bus 21' to operate the vehicle climate control system 30'. In response to receiving the remote start signal via the receiver 46', the vehicle remote start controller 40' is further configured to generate a start command causing the starter circuit 22' to start the engine 24'. As explained above, the move window command, climate control command, and start command may be generated in any order. Moreover, the desired window position may be programmable upon installation, or selectable upon remote starting as will be appreciated by those skilled in the art. For example, it may be desirable to slightly open the windows before starting the air conditioning.

It should be appreciated that the vehicle 35' may have multiple windows, and that therefore multiple window motors 50' may be coupled to the data communications bus 21', and that the vehicle remote start controller 40' may control some or all of these window motors 50' in the fashion described above. Moreover, these window motors 50' may be operated independently of each other by the vehicle remote start controller 40' (i.e. different windows may be operated differently, such that a pair of windows is opened while a pair of windows remains closed, for example).

With reference to the flowchart 130 shown in FIG. 4, a method of operating the remote start system 20' as shown in FIG. 3 is now described. After the start (Block 132), the engine is started using the vehicle remote start controller and in response to a remote start signal received by the receiver (Block 134). Thereafter, the move window command is generated on the data communications bus to cause the window motor to move the vehicle window, using the remote start controller (Block 136). Then, a climate control command is generated on the data communications bus to operate the vehicle climate control system, using the remote start controller (Block 138). Block 140 indicates the end of the method.

With reference to the flowchart 142 shown in FIG. 5, another method of operating the remote start system 20' as shown in FIG. 3 is now described. After the start (Block 144), the move window command is generated on the data communications bus to cause the window motor to move the vehicle window, using the remote start controller and in response to a remote start signal received by the receiver (Block 146). Then, the engine is started using the vehicle remote start controller and in response to a remote start signal received by the receiver (Block 148). Thereafter, a climate control command is generated on the data communications bus to operate the vehicle climate control system, using the remote start controller (Block 150). Block 152 indicates the end of the method.

Figure 6:
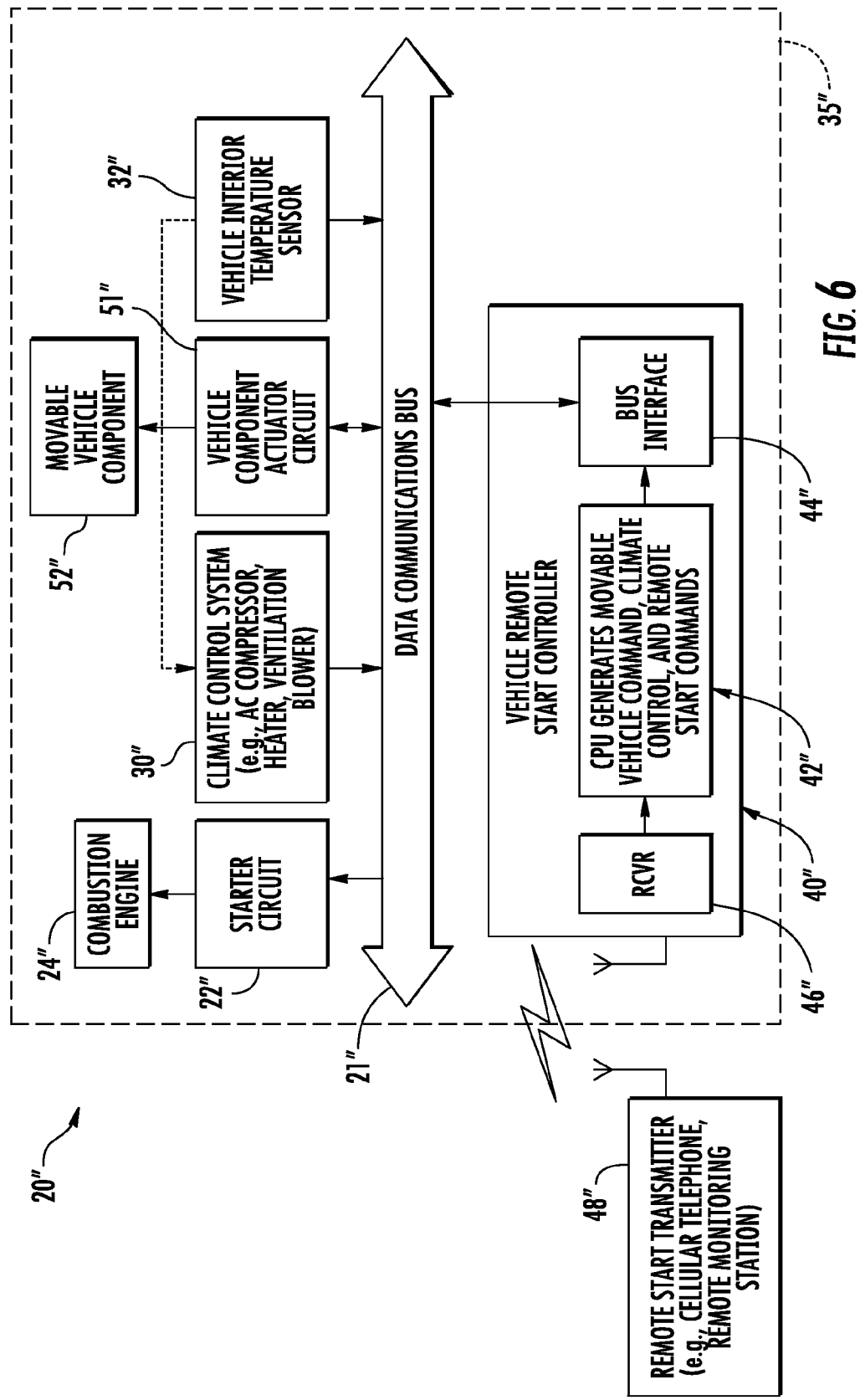
FIG. 6 is a schematic block diagram of a further embodiment of a remote start system for a vehicle in accordance with the present invention.

With reference to FIG. 6, yet another embodiment of the remote start system 20" is now described. The various components shared in common with the remote start control system 20 shown in FIG. 1 operate similarly and need no further description. In this embodiment, a vehicle component actuator circuit 51" that operates a movable vehicle component 52" is coupled to the data communications bus 21". The vehicle component actuator circuit 51" may include the actuator itself and intervening circuitry or controllers, such as a body control module. The movable vehicle component 52" may be a vehicle interior component, such as a seat, telescoping and tilting steering wheel, adjustable pedal(s), or a rear view mirror actuator. The movable vehicle component 52" may also be a vehicle exterior component, such as a side view mirror, wiper blade, or trunk latch, etc.

Here, the vehicle remote start controller 40", and particularly, the CPU 42", in response to a remote start signal received by the receiver 46", is configured to generate the movable vehicle component command on the data communications bus 21" to move the at least one vehicle component actuator 51". The movement of the at least one vehicle component actuator 51" may be based upon personalized settings for the vehicle component stored at the vehicle, or by the vehicle remote start controller 40". Alternatively, the movement of the at least one vehicle component actuator 51" may be based upon input received via the remote start transmitter 48". The vehicle CPU 42", in response to the remote start signal, is also configured to generate the climate control command on the data communications bus 21" to operate the vehicle climate control system 30".

The vehicle remote start controller 40", and particularly, the CPU 42", in response to the remote start signal, is further configured to generate a start signal on the data communications bus 21" to cause the start circuit 22" to start the engine 24". As explained above, it should be understood that the moveable vehicle component command, climate control command, and start command may be generated in different orders.

Figure 7:
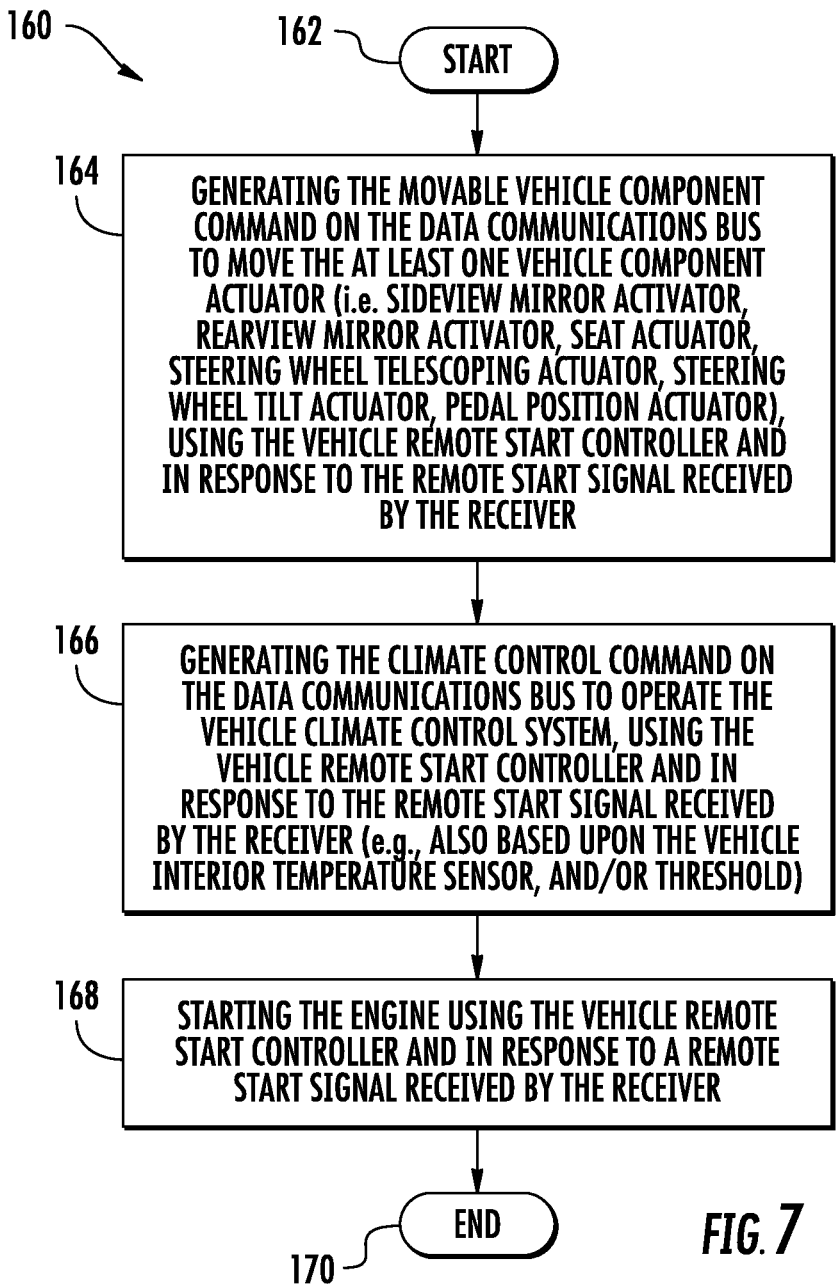
FIG. 7 is a flowchart of a method of operating the remote climate control system of FIG. 7.

With reference to the flowchart 160 shown in FIG. 7, a method of operating the remote starting system 20" shown in FIG. 6 is now described. After the start (Block 162), the movable vehicle component command is generated on the data communications bus to thereby move the at least one vehicle component actuator, using the vehicle remote start controller and in response to the remote start signal being received by the receiver (Block 164). Thereafter, a climate control command is generated on the data communications bus to operate the vehicle climate control system, using the remote start controller (Block 166). Then, the engine is started using the vehicle remote start controller and in response to a remote start signal received by the receiver (Block 168). Block 170 indicates the end of the method.

Figure 8:
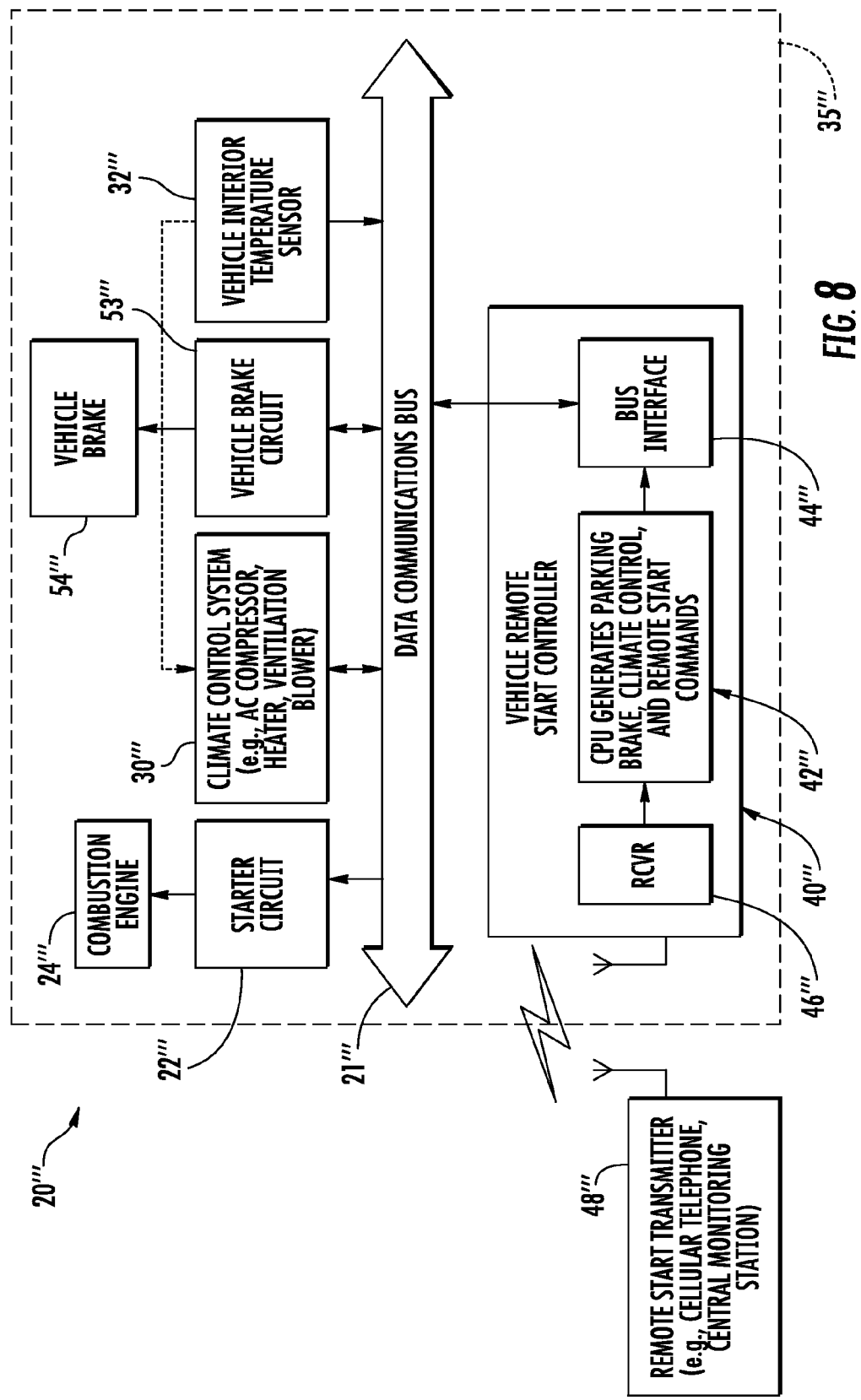
FIG. 8 is a schematic block diagram of a remote start system for a vehicle in accordance with the present invention.

With reference to FIG. 8, a further embodiment of the remote start system 20''' is now described. The various components shared in common with the remote start control system 20 shown in FIG. 1 operate similarly and need no further description. In this embodiment, the vehicle includes at least one vehicle brake 54''', although it should be appreciated that the vehicle may have one brake per wheel, rendering the number of vehicle brakes to typically be four. A vehicle brake circuit 53''' is coupled to the vehicle brake 54''' for operating the vehicle brake. The vehicle brake circuit 53''' may include a brake actuator and a braking controller, for example. In other words, the vehicle brake system may of the type generally described as "brake by wire" where instead of a direct hydraulic circuit operated by the driver's foot, the driver's foot pressure is sensed and digital controls are used to then operate the wheel brakes, or driveline brakes for some vehicles.

Here, the vehicle remote start controller 40''' and particularly, the CPU 42''', in response to a remote start signal received by the receiver 46''', is configured to generate the parking brake command on the data communications bus 21''' to cause the vehicle brake circuit 53''' to operate the at least one vehicle brake 54'''. The CPU 42''' is further configured to generate the climate control command on the data communications bus 21''' to operate the vehicle climate control system 30''', in response to the remote start signal. The CPU 42''' is also configured to generate a start signal on the data communications bus 21''' to cause the starter circuit 22''' to start the engine 24''', in response to the remote start signal. As explained above, the signals may be generated in different orders.

It should be appreciated that the vehicle remote start controller 40''' may operate less than all of the vehicle's brakes. For example, the CPU 42''' of the vehicle remote start controller 40''' may operate a front pair of brakes, or a rear pair of brakes. In some vehicles, the parking brake function is obtained by use of the rear wheel brakes only. Moreover, those of skill in the art should recognize that operating the vehicle brake 54''' would typically be engaging the brake, but in some circumstances it may be desirable to disengage the parking brake, for example. Whether the brakes are engaged or disengaged could be a programmable feature, or could be selectable with each remote start selection by the remote transmitter.

With reference to the flowchart 192 shown in FIG. 9, a method of operating the remote start system 20''' of FIG. 8 is now described. After the start (Block 194), a parking brake command is generated on the data communications bus to operate the at least one vehicle brake, using the vehicle remote start controller and in response to the remote start signal (Block 196). Then, the engine is started using the vehicle remote start controller and in response to the remote start signal (Block 198). Thereafter, the climate control command is generated on the data communications bus to operate the vehicle climate control system, using the vehicle remote start controller and in response to the remote start signal (Block 200). Block 202 indicates the end of the method.

As will be appreciated by those skilled in the art, the remote start control system may in the form of one or more housings, including associated circuitry, added to vehicle after its original manufacture—in other words, the remote start controller may be provided by one or more aftermarket components, considered alone or in cooperation with one or more factory controllers. In other embodiments, the circuitry for the remote start controller may be provided in the vehicle as part of the original factory assembly. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included.

That which is claimed is:

1. A remote start control system for a vehicle comprising a data communications bus extending through the vehicle, an engine, a window motor associated with a window and operating the window based upon a move window command on the data communications bus, and a vehicle climate control system operable based upon a climate control command on the data communications bus, the remote start control system comprising:
   a remote start transmitter remote from the vehicle and configured to generate a remote start signal; and
   a vehicle remote start controller at the vehicle and comprising
      a receiver configured to receive the remote start signal from said remote start transmitter, and
      at least one processor cooperating with said receiver and configured to, in response to the remote start signal,
         generate the move window command on the data communications bus to cause the window motor to move the window,
         generate the climate control command on the data communications bus to operate the climate control system, and
         start the engine.

2. The remote start control system of claim 1, wherein the at least one processor is configured to generate the move window command to cause the window motor to open the window.

3. The remote start control system of claim 1, wherein the at least one processor is configured to generate the move window command to cause the window motor to close the window.

4. The remote start control system of claim 1, wherein said at least one processor is configured to start the engine after generating the move window command and before generating the climate control command.

5. The remote start control system of claim 1, wherein the vehicle comprises a vehicle interior temperature sensor; and wherein said at least one processor is configured to generate the climate control command on the data communications bus also based upon the vehicle interior temperature sensor.

6. The remote start control system of claim 5, wherein the vehicle interior temperature sensor is coupled to the data bus for communication with said vehicle remote start controller thereover.

7. The remote start control system of claim 5, wherein the climate control system comprises an air conditioning compressor; and wherein said at least one processor is configured to generate the climate control command to activate the air conditioning compressor when an interior temperature sensed from the vehicle interior temperature sensor is above a threshold.

8. The remote start control system of claim 5, wherein the climate control system comprises a heater; and wherein said at least one processor is configured to generate the climate control command to activate the heater when an interior temperature sensed from the vehicle interior temperature sensor is below a threshold.

9. The remote start control system of claim 1, wherein the climate control system comprises a ventilation blower; and wherein said at least one processor is configured to generate the climate control command to activate the ventilation blower.

10. The remote start control system of claim 1, wherein said vehicle remote start controller comprises a multi-vehicle compatible remote start controller.

11. The remote start control system of claim 1, wherein said remote start transmitter comprises a cellular telephone.

12. The remote start control system of claim 1, wherein said remote start transmitter comprises a central monitoring station.

13. A vehicle remote start controller for a vehicle comprising a data communications bus extending through the vehicle, an engine, a window motor associated with a window and operating the window based upon a move window command on the data communications bus, and a vehicle climate control system operable based upon a climate control command on the data communications bus, the vehicle remote start controller comprising:

a receiver configured to receive a remote start signal transmitter from a remote start transmitter remote from the vehicle; and at least one processor cooperating with said receiver and configured to, in response to the remote start signal generate the move window command on the data communications bus to cause the window motor to move the window, generate the climate control command on the data communications bus to operate the climate control system, and start the engine.

14. The vehicle remote start controller of claim 13, wherein the at least one processor is configured to generate the move window command to cause the window motor to open the window.

15. The vehicle remote start controller of claim 13, wherein the at least one processor is configured to generate the move window command to cause the window motor to close the window.

16. The vehicle remote start controller of claim 13, wherein said at least one processor is configured to start the engine after generating the move window command and before generating the climate control command.

17. The vehicle remote start controller of claim 13, wherein the vehicle comprises a vehicle interior temperature sensor; and wherein said at least one processor is configured to generate the climate control command on the data communications bus also based upon the vehicle interior temperature sensor.

18. The vehicle remote start controller of claim 17, wherein the vehicle interior temperature sensor is coupled to the data bus for communication thereover.

19. The vehicle remote start controller of claim 17, wherein the climate control system comprises an air conditioning compressor; and wherein said at least one processor is configured to generate the climate control command to activate the air conditioning compressor when an interior temperature sensed from the vehicle interior temperature sensor is above a threshold.

20. The vehicle remote start controller of claim 17, wherein the climate control system comprises a heater; and wherein said at least one processor is configured to generate the climate control command to activate the heater when an interior temperature sensed from the vehicle interior temperature sensor is below a threshold.

21. The vehicle remote start controller of claim 13, wherein the climate control system comprises a ventilation blower; and wherein said at least one processor is configured to generate the climate control command to activate the ventilation blower.

22. A method of operating a remote start control system for a vehicle comprising a data communications bus extending through the vehicle, an engine, a window motor associated with a window and operating the window based upon a move window command on the data communications bus, and a vehicle climate control system operable based upon a climate control command on the data communications bus, the method comprising, in response to a remote start signal from a remote start transmitter away from the vehicle:

generating, using a vehicle remote start controller at the vehicle, the move window command on the data communications bus to cause the window motor to move the window;

generating, using the vehicle remote start controller, the climate control command on the data communications bus to operate the vehicle climate control system; and starting, using the vehicle remote start controller, the engine.

23. The method of claim 22, wherein generating the move window command comprises generating the move window command to cause the window motor to open the window.

24. The method of claim 22, wherein generating the move window command comprises generating the move window command to cause the window motor to close the window.

25. The method of claim 22, wherein the engine is started by the vehicle remote start controller after generating the move window command and before generating the climate control command.

26. The method of claim 22, wherein the vehicle comprises a vehicle interior temperature sensor; and wherein the climate control command is generated on the data communications bus also based upon the vehicle interior temperature sensor.

27. The method of claim 26, wherein the climate control system comprises an air conditioning compressor;

and wherein the climate control command is generated to activate the air conditioning compressor when an interior temperature sensed from the vehicle interior temperature sensor is above a threshold.

28. The method of claim 26, wherein the climate control system comprises a heater; and wherein the climate control command is generated to activate the heater when an interior temperature sensed from the vehicle interior temperature sensor is below a threshold.

\* \* \* \* \*